(12) United States Patent
Chin et al.

(10) Patent No.: US 6,211,990 B1
(45) Date of Patent: Apr. 3, 2001

(54) OPTICAL SCANNING DEVICE

(75) Inventors: Wai-Fai Chin, Seattle; James E. Thomas, Issaquah; Bruce R. Scharf, Seattle, all of WA (US)

(73) Assignee: Microscan Systems Incorporated, Renton, WA (US)

( * ) Notice: Subject to any disclaimer, the term of this patent is extended or adjusted under 35 U.S.C. 154(b) by 0 days.

(21) Appl. No.: 09/333,700

(22) Filed: Jun. 16, 1999

Related U.S. Application Data

(62) Division of application No. 08/893,336, filed on Jul. 16, 1997, now Pat. No. 5,999,301.

(51) Int. Cl.[7] .................................................. G02B 26/08
(52) U.S. Cl. ......................... 359/216; 359/871; 359/198

(58) Field of Search .................................... 359/196–226, 359/850, 855–857, 871–872, 529; 235/467, 470, 463

(56) References Cited

U.S. PATENT DOCUMENTS 5,457,550 * 10/1995 Baba et al. ........................... 359/201

* cited by examiner

*Primary Examiner*—James Phan
(74) *Attorney, Agent, or Firm*—Graybeal Jackson Haley LLP

(57) ABSTRACT

A laser bar code scanner employing a retroreflector in combination with a rotating polygon reflector to increase scan width and reduce curvature in the scanning beam.

4 Claims, 3 Drawing Sheets

OPTICAL SCANNING DEVICE

This is a divisional of the prior application Ser. No. 08/893,336, filed Jul. 16, 1997, U.S. Pat. No. 5,999,301.

FIELD OF THE INVENTION

The present invention relates generally to optical scanning devices, and more particularly to a laser bar code scanner which folds the scan beam to generate a straight scan beam and increase scan beam width near the scanner.

BACKGROUND OF THE INVENTION

Laser bar code scanners employ a focused beam of light to repetitively scan across a bar code label. Typically, the scanning is produced by dynamic deflection of the source beam off of a rotating polygon reflector. Laser light reflections containing information from the scanned bar code are sensed in a photodetector. The bar code label encodes information as a series of bars of various widths formed on a contrasting background. The difference between the reflectance of the bars compared to the spaces produces a modulated optical signal. The detected optical signal representing reflections from the label is then converted into an electrical signal by the photodetector and that signal is further processed and then decoded.

A general and long known problem with laser bar code scanners is that the width of the scanning beam becomes narrower the closer the scanned object is to the scanner. The narrowing of the scanning area often requires that the item to be scanned be positioned carefully in a predetermined target area to ensure that the bar code is properly scanned.

One solution to reducing the above targeting constraint is to increase the distance between the object to be scanned and the scanner. This may not always be desirable. Also, there are circumstances in which proximity between the scanner and the object to be scanned is essential. Another solution is to increase the optical path within the scanner so that the exiting scan beam is wider. While this method is effective, it usually requires increasing the dimensions of the scanning device which is usually undesirable, and can make the device entirely impractical for a number of applications.

One solution to the problem of widening the scanning area close to the scanner is to use a beam folding mirror to increase the optical path within the scanner housing, thereby increasing the scanning width, without commensurate increase in size of the scanner. However, while folding mirrors work quite well in other applications, including cameras and telescopes, mirrors introduce optical path distortion when used in conjunction with scanning reflectors (e.g. rotating polygon scan reflectors). One of the most serious problems is the generation of a curved scanning beam.

The curved scanning beam is commonly referred to as either a "sad" or "smile" face scan beam pattern. The "sad" or "smile" face scan pattern is generated by the distance translation of a rotating polygon reflector and a flat fold mirror about the polygon.

There is a need for a compact laser bar code scanner that produces a wide scanning area even when object to be scanned is placed close to the scanner. There is a further need that the beam have a flat, non-distorted scanning beam that can be produced by a compact laser bar code scanner that is reliable and economical to manufacture.

SUMMARY OF THE INVENTION

In accordance with one aspect of the present invention, a retroreflector is incorporated after a moving reflector so as to increase the width of the scanning beam and eliminate the curvature of the scan pattern. The retroreflector increases the scanning area width by folding, thereby effectively lengthening, the optical path within the scanner housing. Through the use of this technique it is possible to produce a compact scanner which, for example, can produce a scan width of 4 inches at a distance of 2 inches from the scanner.

The retroreflector may, for example, be a 90 degree prism, a corner cube, or two plane mirrors forming 90 degrees. A dynamically reflected beam from a moving reflector enters the retroreflector in one plane and exits in another plane in the opposite direction and parallel to the entering beam. Thus, the input beam from a light source forming a 90 degree angle with the vertical side of the scanning reflector facet will exit at 90 degrees after folding from the retroreflector and without any scanning beam curvature.

In the preferred embodiment the optical component of the present invention are held in position by a unitary mounting structure, also referred to as an "optical bench", which eliminates the need for adjusting the optical system. The optical bench not only eliminates the need for tuning the optical system but increases the stability of the system over time. The optical bench may be manufactured from any number of well known materials including metals, plastics, and ceramics. An additional benefit is that the optical bench can be die cast or injection molded which reduces the fabrication costs.

As discussed, the laser scanning system is based upon a rotating polygon. In the preferred embodiment the laser is of a type having a multiple quantum well design. The size of the polygon is dictated by the type of motor used, and the particular dimensions will depend upon rotation speed of the motor and the desired scan width. In the preferred embodiment the polygon has between 8 and 12 facets.

The present invention significantly improves upon the prior art by allowing the construction of a compact scanning device with a folded optical path providing an increased scanning width without suffering beam curvature. These and other features of the present invention will be more fully appreciated when considered in light of the following detailed description and drawings.

DETAILED DESCRIPTION OF THE INVENTION

Figure 1:
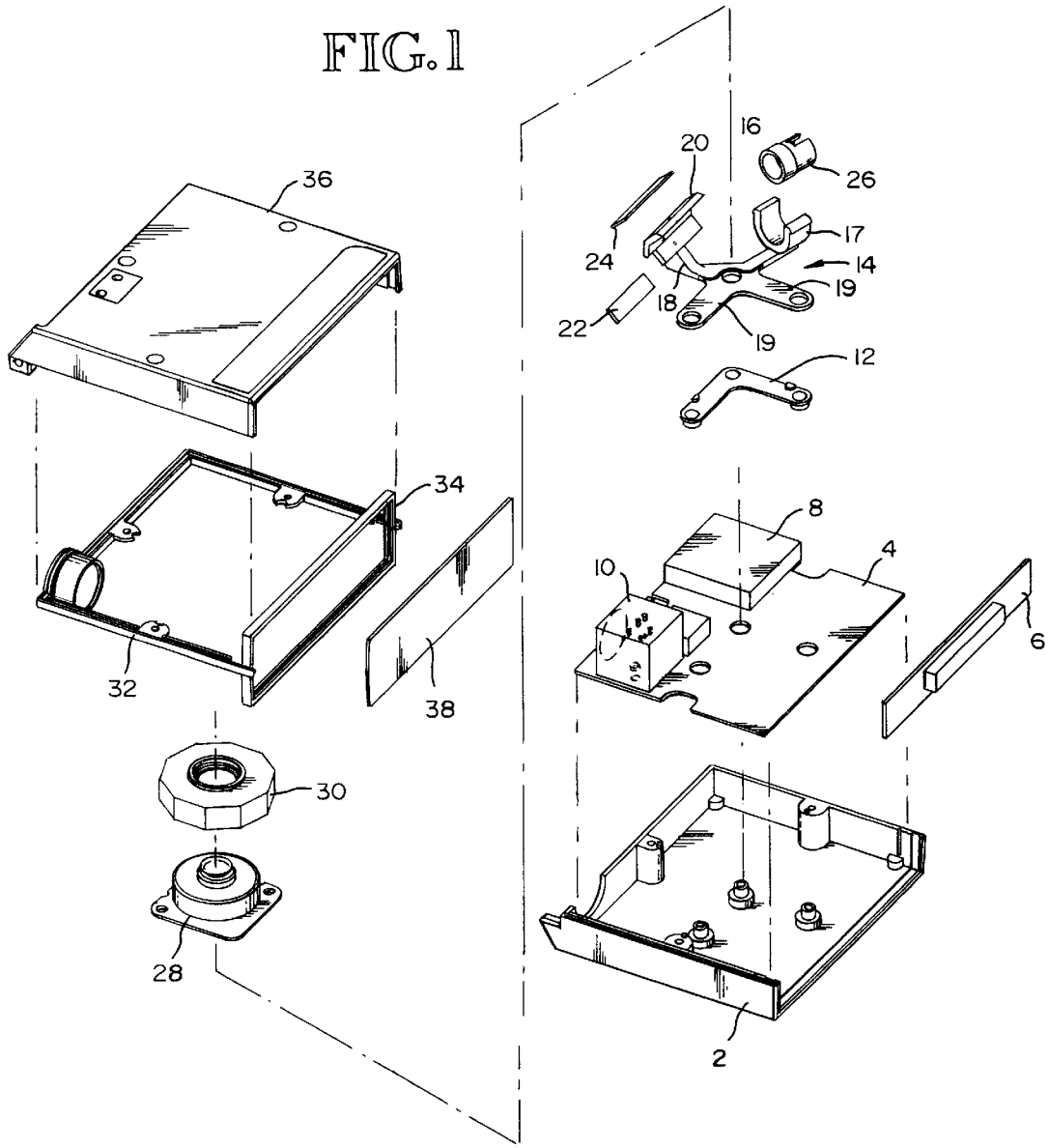
FIG. 1 is an exploded detail view of the components of the present invention.

FIG. 1 illustrates a lower housing section 2 into which is fitted a primary printed circuit board 4 and photo detector printed circuit board 6. Primary printed circuit 4 is provided with a control integrated circuit 8 and data port 10. Optical bench 14 is centrally mounted on primary printed circuit board 4 and a motor spacer 12 is mounted on top of the optical bench 14. Optical bench 14 is further comprised of laser mounting support 16 and retroreflector mounting support 18. A retroreflector 20 is mounted upon an upper portion or appendage 21 of retroreflector mounting support 18 and is provided with a lower reflector 22 and an upper reflector 24. A laser 26 is detachably mounted on an appendage 17 of the laser mounting support 16. A polygon reflector motor 28 is mounted on appendages 19 which, in turn, are positioned on the motor spacer 12 and opposite the laser mounting support 16 and retroreflector mounting support 18. A polygon reflector 30 is detachably mounted on polygon reflector motor 28. The optical bench 14 holds laser 26, polygon reflector 30, and retroreflector 20 in optical alignment and removes the need for adjusting the optical system. Housing gasket 32, which includes housing window frame 34, is circumferentially mounted on top of lower housing section 2. Upper housing section 36 mounts on top of housing gasket 32 and housing window 38 mounts within housing window frame 34.

Figure 2:
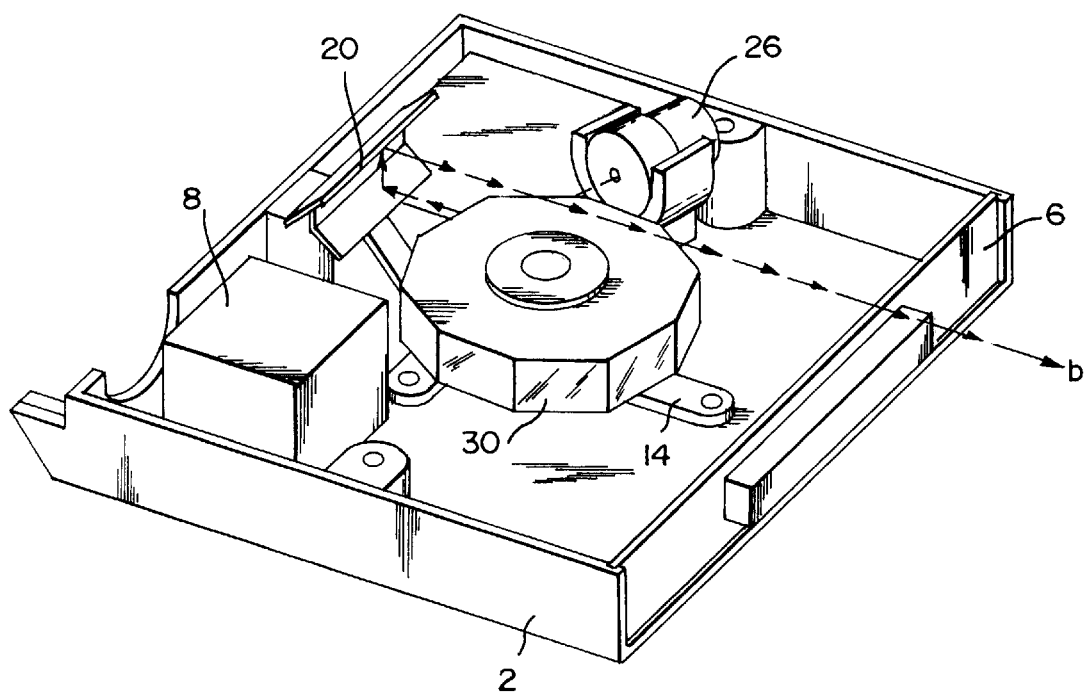
FIG. 2 isometric view of the polygon reflector and retroreflector system directing a laser scan line.

FIG. 2 illustrates the device in operation where laser 26 produces a focused beam of light b which is projected onto polygon reflector 30. The beam b is deflected by polygon reflector 30 towards the lower reflector 22 of retroreflector 20, the beam b is then reflected up to upper reflector 24 where it is then reflected out of the scanner. In the preferred embodiment this arrangement can produce a 4 inch wide scanning beam at 2 inches in a device that measures less than 3 inches on a side.

Figure 3:
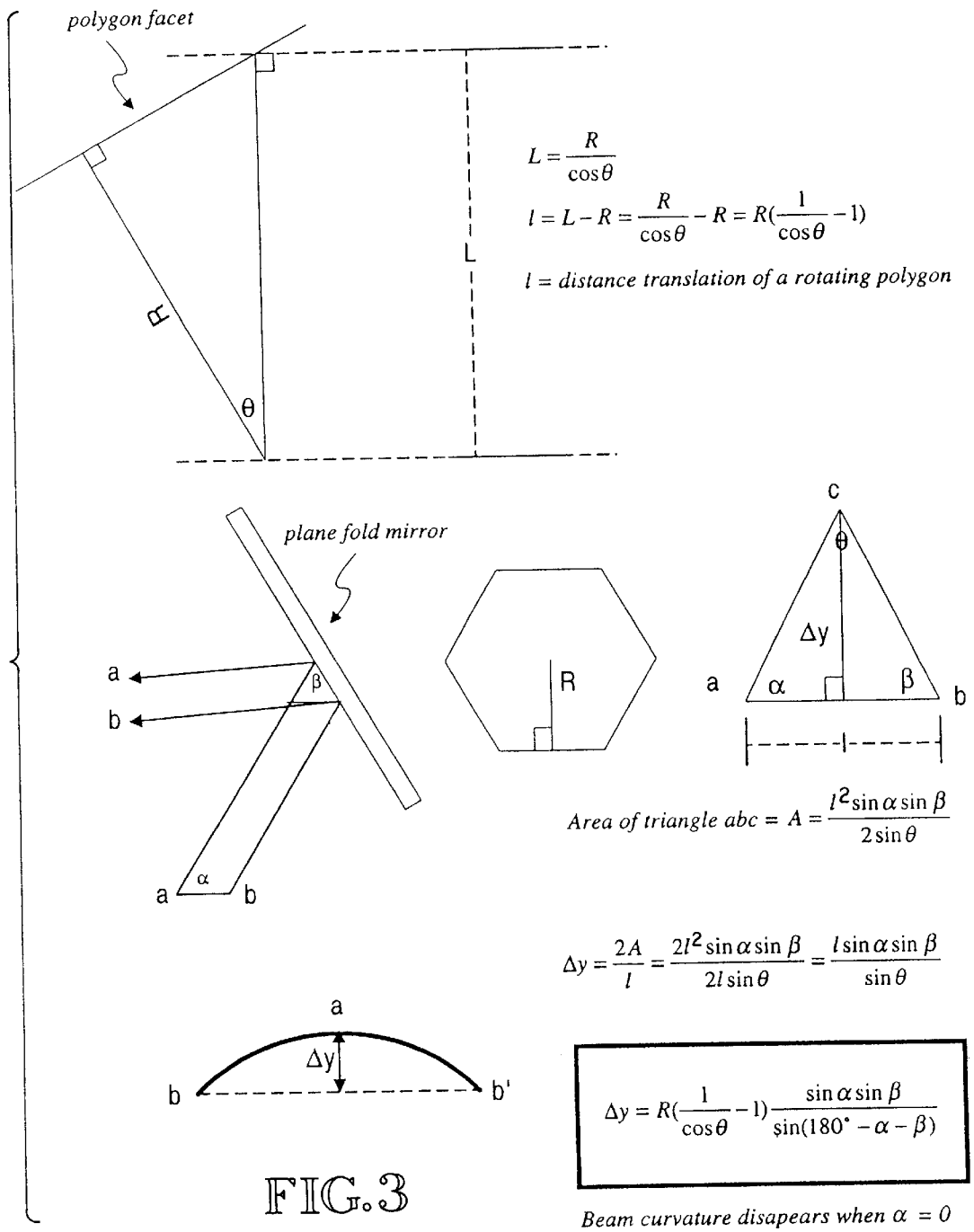
FIG. 3 is a functional diagram of how beam curavture is infduced by a plane fold mirror.

FIG. 3 illustrates how curvature results from the use of a rotating polygon reflector in conjunction with a plane fold mirror. By using retroreflector 20 angle α goes to 0 and the beam is flattened.

From the foregoing teachings, it can be appreciated by one skilled in the art that a new, novel, and nonobvious optical scanning device has been disclosed. It is to be understood that numerous alternatives and equivalents will be apparent to those of ordinary skill in the art, given the teachings herein, such that the present invention is not to be limited by the foregoing description but only by the appended claims.

We claim:

1. An optical scanning device comprising:

a base structure having a main body portion and multiple appendages forming a first fixed mounting support, a second fixed mounting support, and a third fixed mounting support, wherein said base structure has a central region from which extends a first appendage which forms said first mounting support, second and third appendages which form said second mounting support, and a fourth appendage which forms said third mounting support;

a retroreflector having a light receiving surface and a light transmitting surface attached to said first mounting support;

a rotating polygon reflector positioned at said second mounting support so as to reflect light onto said light receiving surface;

an optical scanning beam source attached to said third mounting support and positioned so as to project light onto said rotating polygon reflector so that the beam is reflected onto said light receiving surface; and wherein said base structure is configured such that said first, second and third fixed mounting supports locate said retroreflector, said rotating polygon reflector, and said optical scanning beam source at the vertices of a triangle.

2. The device of claim 1, wherein said first appendage is of a shape and configuration to provide a scanning beam reflected by said light transmitting surface with a clear line of sight to an object to be scanned.

3. The device of claim 1, wherein said second and third appendages are of a shape and configuration to provide a scanning beam reflected by said rotating polygon reflector with an unobstructed optical path to the light receiving surface of said retroreflector.

4. The device of claim 1, wherein said fourth appendage is of a shape and configuration to provide a scanning beam produced by said optical scanning beam source with an unobstructed optical path to the rotating polygon reflector.

* * * * *